(12) United States Patent
Tachibana

(10) Patent No.: US 8,941,477 B2
(45) Date of Patent: Jan. 27, 2015

(54) COMMUNICATION APPARATUS AND METHOD OF CONTROLLING THE SAME

(75) Inventor: Hideaki Tachibana, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 831 days.

(21) Appl. No.: 13/149,575

(22) Filed: May 31, 2011

(65) Prior Publication Data

US 2011/0309921 A1    Dec. 22, 2011

(30) Foreign Application Priority Data

Jun. 18, 2010    (JP) .................................. 2010-139949

(51) Int. Cl.
| | |
|---|---|
| *H04B 3/36* | (2006.01) |
| *H04B 7/155* | (2006.01) |
| *H04B 7/14* | (2006.01) |
| *H04N 1/00* | (2006.01) |
| *H04N 101/00* | (2006.01) |

(52) U.S. Cl.
CPC .............. *H04B 7/15557* (2013.01); *H04B 7/14* (2013.01); *H04N 1/00127* (2013.01); *H04N 1/00307* (2013.01); *H04N 2101/00* (2013.01); *H04N 2201/0084* (2013.01); *H04N 2201/0087* (2013.01)
USPC ............................ 340/425.1; 455/7; 455/11.1

(58) Field of Classification Search
CPC ... H04W 88/04; H04W 84/18; H04W 84/005; H04W 88/182; H04B 7/2606; H04B 7/15542; H04L 67/28
USPC ..................................................... 455/7–25
See application file for complete search history.

(56) References Cited

U.S. PATENT DOCUMENTS

| | | | | |
|---|---|---|---|---|
| 6,215,764 | B1 * | 4/2001 | Wey et al. ...................... | 370/216 |
| 8,365,249 | B1 * | 1/2013 | Cope et al. ........................ | 726/3 |
| 8,494,442 | B2 * | 7/2013 | Sato .............................. | 455/11.1 |
| 2003/0218996 | A1 * | 11/2003 | Sumino et al. ................. | 370/328 |
| 2004/0033779 | A1 * | 2/2004 | Ochi et al. .................... | 455/11.1 |
| 2004/0219878 | A1 * | 11/2004 | Raji .............................. | 455/11.1 |
| 2005/0181792 | A1 * | 8/2005 | Kobayashi et al. ......... | 455/435.2 |
| 2006/0056331 | A1 * | 3/2006 | Ratiu et al. ..................... | 370/316 |
| 2010/0118846 | A1 * | 5/2010 | Moeller ......................... | 370/338 |
| 2011/0202797 | A1 * | 8/2011 | Mezhibovsky et al. ......... | 714/24 |

FOREIGN PATENT DOCUMENTS

| | | | | |
|---|---|---|---|---|
| JP | 2008-67192 | | 3/2008 | |
| WO | WO 2008047884 | A1 * | 4/2008 | .............. H04L 29/08 |

* cited by examiner

*Primary Examiner* — Brent Swarthout
(74) *Attorney, Agent, or Firm* — Fitzpatrick, Cella, Harper & Scinto

(57) ABSTRACT

A communication apparatus for transmitting data to a data accumulation apparatus via a relay apparatus detects, by communication with the relay apparatus, which is the relay function used by the relay apparatus to operate, a proxy relay function of temporarily holding and proxy-transmitting the data and a transparent relay function of transparently transmitting the data without holding. The communication apparatus transmits the data based on the detected relay function. When the data is being transmitted using the relay apparatus operating by the transparent relay function, and a disconnection notification representing disconnection of communication between the relay apparatus and the data accumulation apparatus is received from the relay apparatus, the data transmission is immediately stopped. When the data is being transmitted using the relay apparatus operating by the proxy relay function, the data transmission is continued.

10 Claims, 9 Drawing Sheets

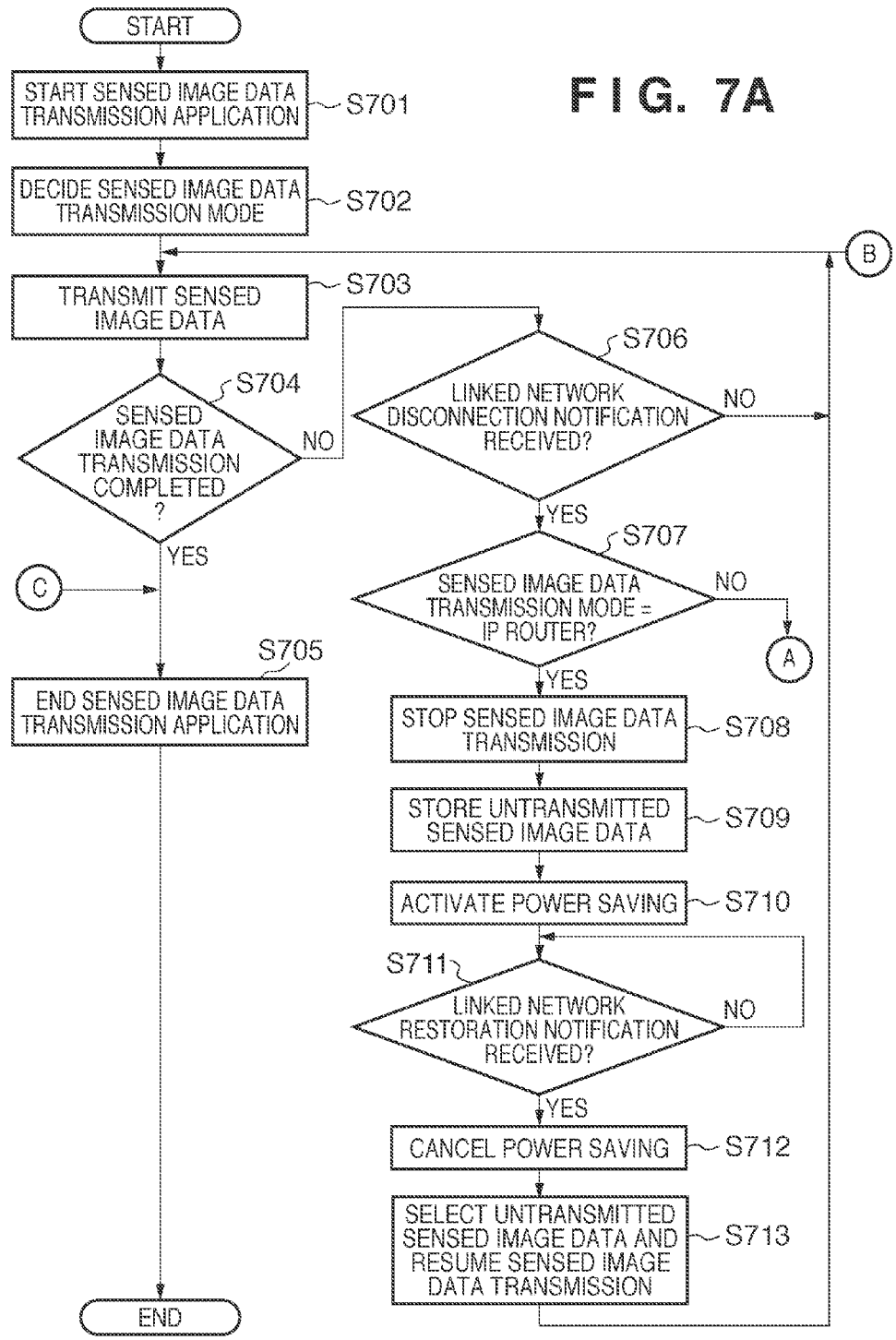

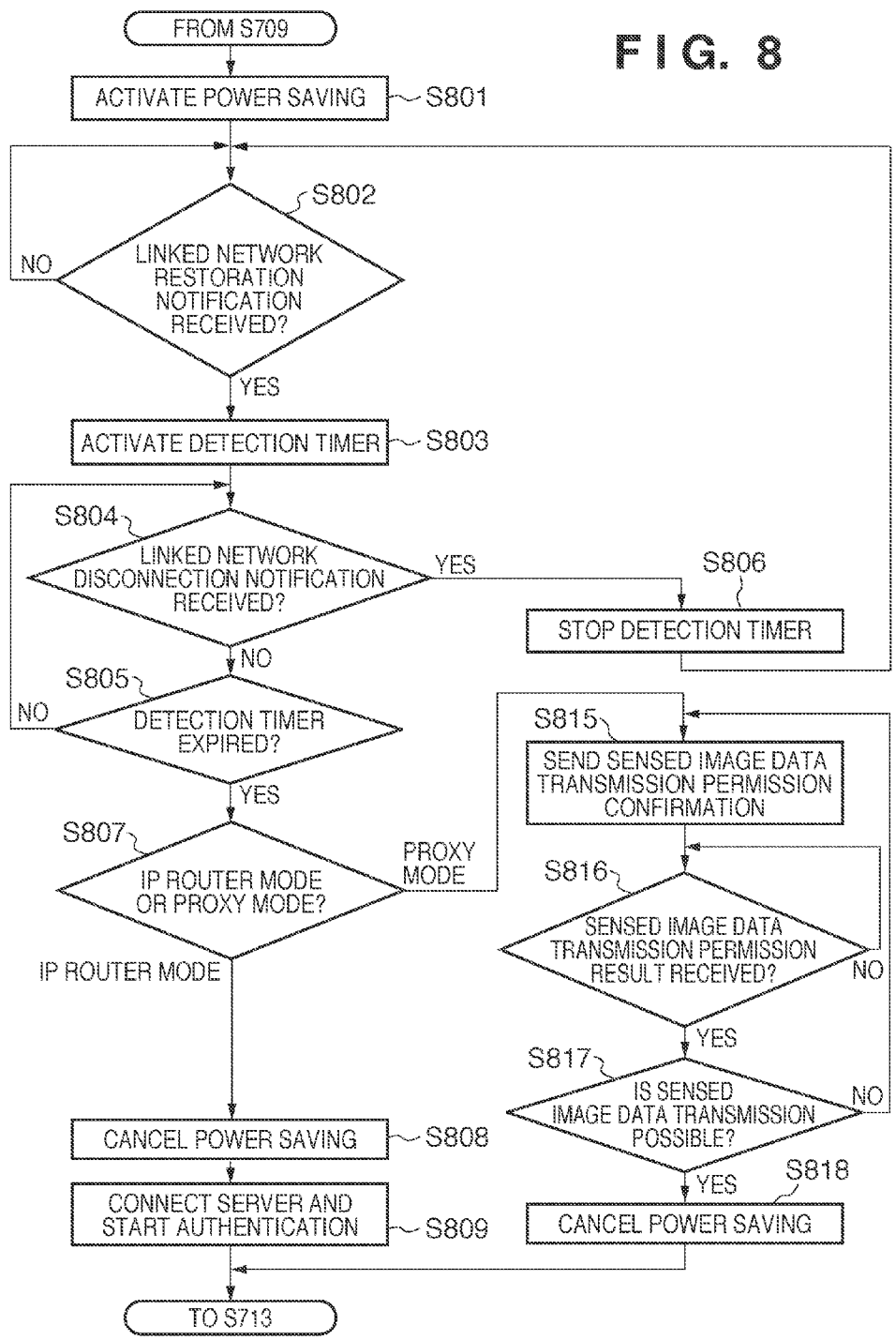

COMMUNICATION APPARATUS AND METHOD OF CONTROLLING THE SAME

BACKGROUND OF THE INVENTION

1. Field of the Invention

The present invention relates to a communication apparatus that performs data communication with another apparatus via a relay apparatus and a method of controlling the same.

2. Description of the Related Art

Recently, there exist services that allow a user to upload image data obtained by a digital camera to a server on a public network so that other users can browse the image. The digital camera sometimes communicates with the server on the public network via a relay apparatus. Some relay apparatuses have a proxy function, while others do not.

A relay apparatus having the proxy function acts as the communication partner of a digital camera so as to receive and hold (cache) data. The relay apparatus proxy-transmits the data to a server as the communication partner on behalf of the digital camera. A relay apparatus having no proxy function relays data transmitted from a digital camera to a server as the communication partner.

Japanese Patent Laid-Open No. 2008-67192 (hereinafter referred to as patent document 1) describes an arrangement that causes a communication apparatus to transmit data to another communication apparatus via a relay apparatus having the proxy function. According to patent document 1, even when the communication between the communication apparatus and the other communication apparatus is disconnected, data transmission from the communication apparatus to the relay apparatus continues so that the relay apparatus receives and holds the transmitted data. When the communication between the communication apparatus and the other communication apparatus is restored, the relay apparatus proxy-transmits the held data to the other communication apparatus.

However, when communication between a relay apparatus having no proxy function and another communication apparatus is disconnected, the relay apparatus discards data regardless of continuous transmission from the communication apparatus. Hence, the communication apparatus need not continue data transmission.

SUMMARY OF THE INVENTION

According to a preferred embodiment of the present invention, there is provided a communication apparatus which, when transmitting data to another communication apparatus via a relay apparatus, allows to execute data transmission according to the data relay function of the relay apparatus.

In order to achieve the above object, a communication apparatus according to an aspect of the present invention has the following arrangement. That is, there is provided a communication apparatus comprising: a transmission unit configured to transmit data to another communication apparatus via a relay apparatus; a detection unit configured to detect which is a relay function used by the relay apparatus to operate, a first relay function of causing the relay apparatus to receive the data transmitted from the communication apparatus to the relay apparatus as a communication partner and proxy-transmit the data to the other communication apparatus as a communication partner or a second relay function of causing the relay apparatus to relay the data transmitted from the communication apparatus to the other communication apparatus as a communication partner; and a control unit configured to, in case of disconnection of communication between the relay apparatus and the other communication apparatus, continue the data transmission by the transmission unit when the relay apparatus is operating by the first relay function and interrupt the data transmission by the transmission unit when the relay apparatus is operating by the second relay function.

Further features of the present invention will become apparent from the following description of exemplary embodiments with reference to the attached drawings.

BRIEF DESCRIPTION OF THE DRAWINGS

FIGS. 7A and 7B are flowcharts illustrating data transmission processing of the digital camera; and FIG. 8 is a flowchart for explaining data transmission processing.

DESCRIPTION OF THE EMBODIMENTS

A hardware configuration in a preferred example for practicing the present invention will be explained. A communication apparatus according to the embodiment will now be described in detail with reference to the accompanying drawings. A wireless LAN system complying with the IEEE802.11 series is used in the example to be described below. However, the communication form need not always be the wireless LAN based on the IEEE802.11.

First Embodiment

Figure 1:
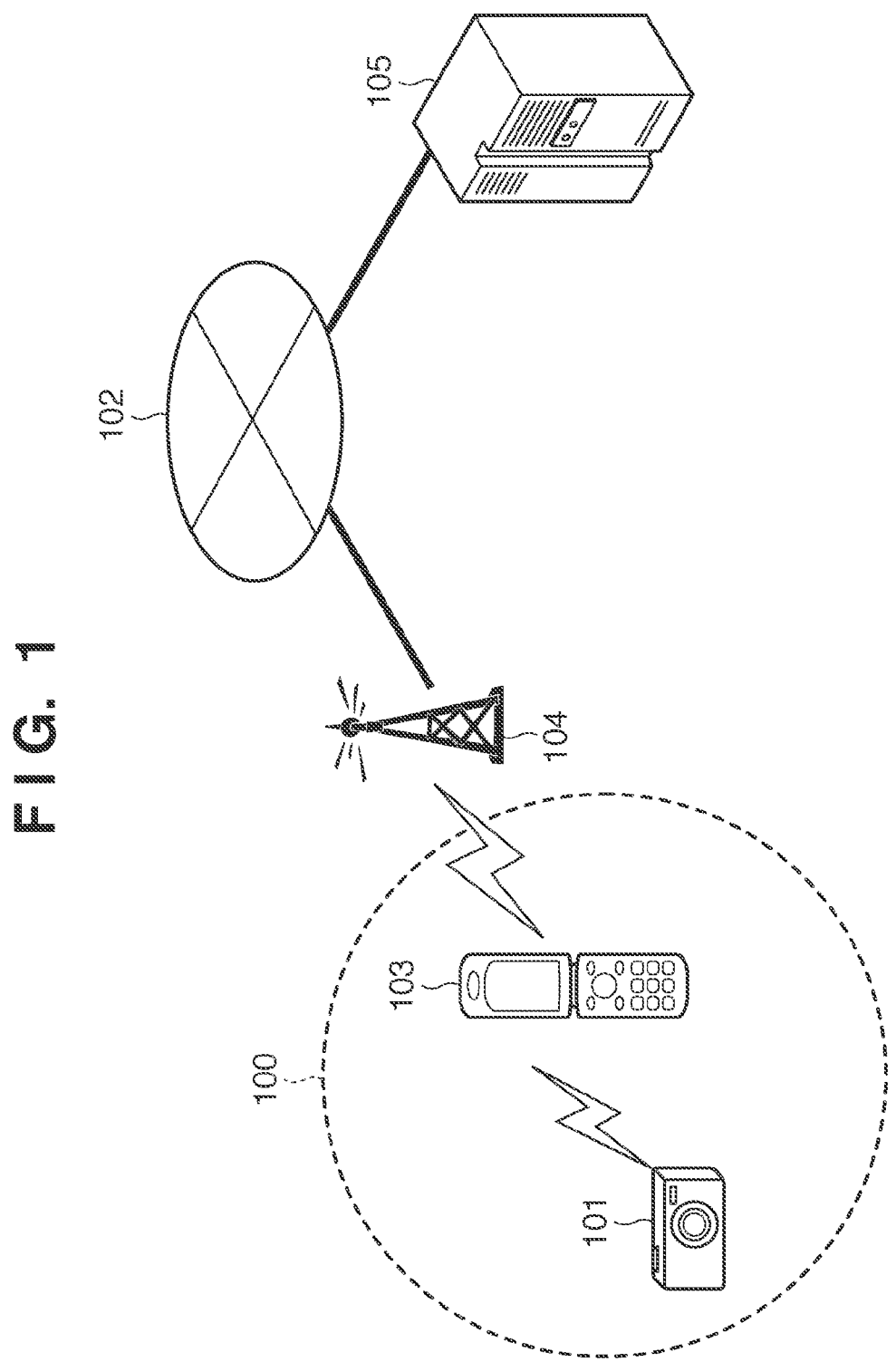
FIG. 1 is a view showing a system configuration.

FIG. 1 is a view for explaining a system configuration example according to the embodiment. A wireless LAN 100 is built by a communication interface unit (to be referred to as a communication I/F hereinafter) 206 of a digital camera 101 to be described later. The digital camera 101 and a cellular phone 103 are wirelessly connected via the wireless LAN 100 on an ad hoc basis. Note that not the wireless LAN 100 but Bluetooth® or IrDA (infrared communication) may be used to wirelessly connect the digital camera 101 and the cellular phone 103. The cellular phone 103 is also connected to a public network 102 via a cellular phone base station 104 (to be referred to as the base station 104 hereinafter). A Web server 105 serving as another communication apparatus and capable of accumulating sensed image data is connected to the public network 102.

The cellular phone 103 has the function (relay function) of a relay apparatus that relays sensed image data transmitted from the digital camera 101 to the Web server 105. The cellular phone 103 has the following two relay functions. In the first relay function, the cellular phone 103 acts as the communication partner of the digital camera 101 so as to receive and hold data transmitted from the digital camera. The cellular phone 103 then proxy-transmits the held data to the Web server 105 as the communication partner. This function will be referred to as a proxy function hereinafter. In the second relay function, the cellular phone 103 relays data transmitted from the digital camera 101 to the Web server 105 as the communication partner. This function will be referred to as an IP router function hereinafter.

Figure 2:
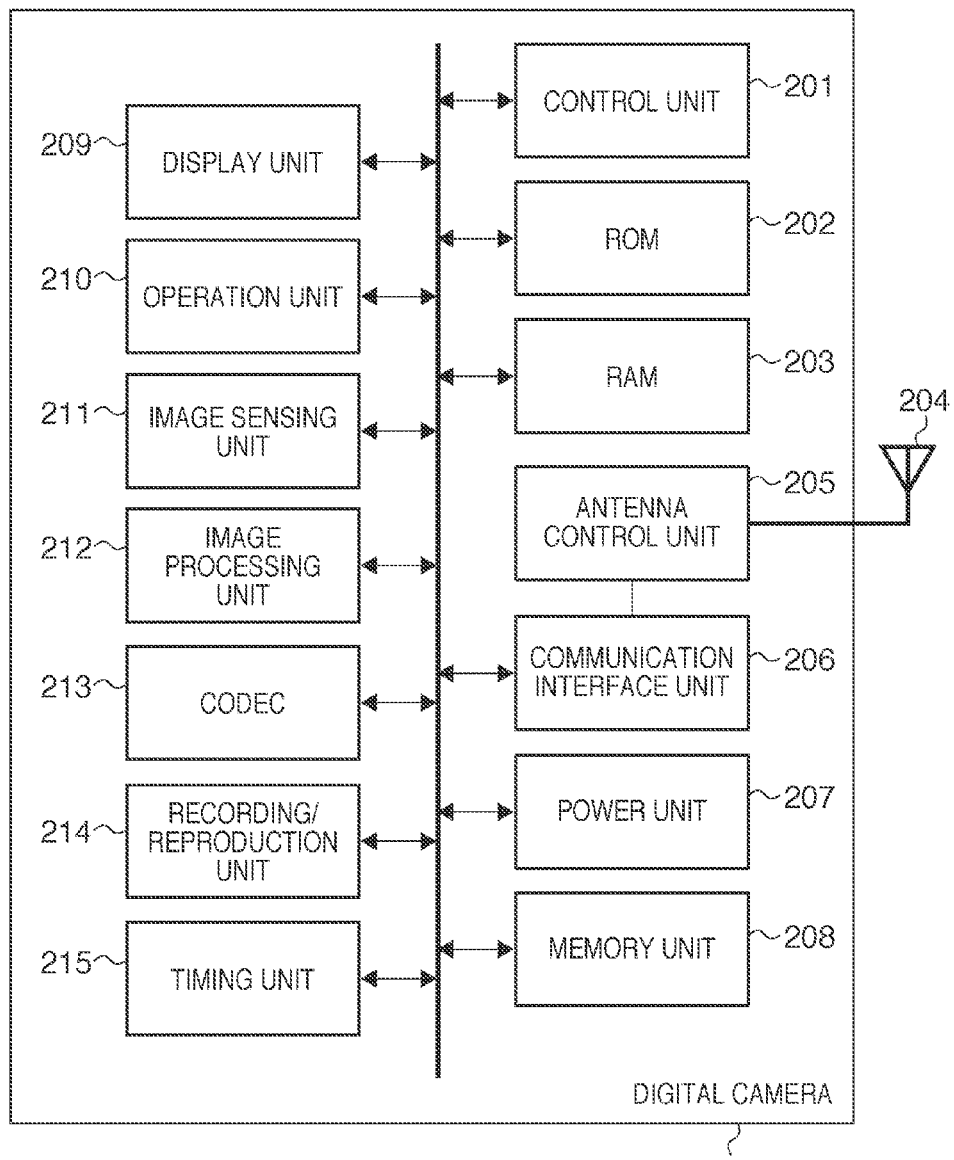
FIG. 2 is a block diagram showing the hardware configuration of a digital camera.

FIG. 2 is a block diagram showing the hardware configuration of the digital camera 101. A control unit 201 includes a CPU (not shown) and the like to control the digital camera 101. A ROM 202 stores programs including control instructions to be executed by the control unit 201, and the like. A RAM 203 functions as, for example, a work memory when the control unit 201 executes various kinds of processing. An antenna 204, an antenna control unit 205, and the communication I/F 206 operate as a wireless unit that performs wireless communication processing. A power unit 207 supplies power to the components of the digital camera 101. A memory unit 208 stores and manages various kinds of data such as image data obtained by image sensing. A detachable recording medium may be used as the memory unit 208. A display unit 209 performs various kinds of display for the user. An operation unit 210 accepts operation instructions from the user. An image sensing unit 211 senses the optical image of an object.

An image processing unit 212 converts the optical image output from the image sensing unit 211 into image data in a predetermined format. A codec 213 performs predetermined compression coding for the image data output from the image processing unit 212, and supplies the compression-coded image data (compressed image data) to a recording/reproduction unit 214. The codec 213 also decompresses compressed image data received from the recording/reproduction unit 214. The recording/reproduction unit 214 records the compressed image data in the memory unit 208 or reads it out from the memory unit 208 for reproduction. Note that although this embodiment uses JPEG (Joint Photographic Experts Group) to compress image data, the present invention is not limited to this. A timing unit 215 measures time.

Note that the above-described hardware configuration is merely an example of the embodiment of the present invention and is not necessarily critical. The present invention incorporates all hardware configurations applicable to the embodiment.

Figure 3:
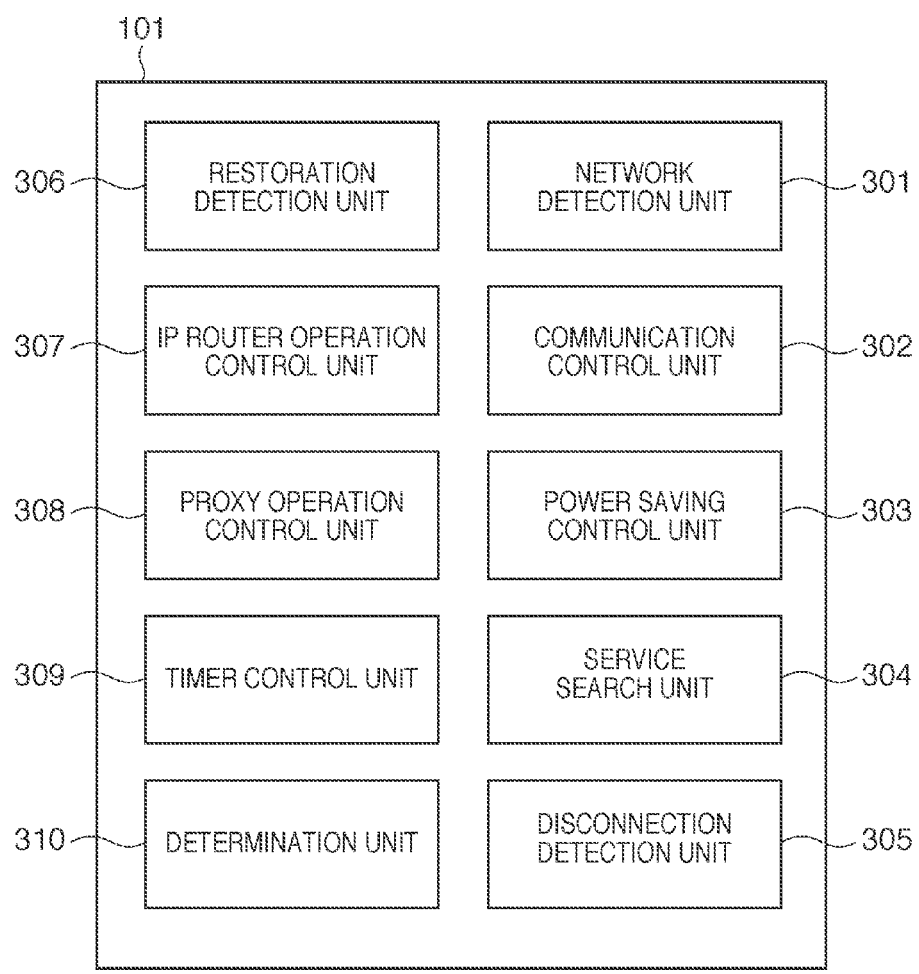
FIG. 3 is a functional block diagram of the digital camera.

FIG. 3 is a functional block diagram of the communication apparatus (digital camera 101) according to the embodiment. In this embodiment, the functional blocks of the communication apparatus are stored in the ROM 202 as programs and implemented when executed by the control unit 201. Note that some of the functional blocks of the communication apparatus shown in FIG. 3 may be implemented as hardware. The functional blocks of the communication apparatus will be described below with reference to FIG. 3.

A network detection unit 301 detects a network that exists near the digital camera 101. A communication control unit 302 controls the communication I/F 206 so as to control wireless layer communication or communication of the layer above the wireless layer, for example, ICP/IP communication processing. A power saving control unit 303 shifts communication executed by the communication control unit 302 to a power saving mode to save power, or cancels the power saving mode. In the power saving mode, the power of the communication I/F 206 is saved by switching between an Awake state that allows data transmission/reception and a Doze state that prohibits data transmission/reception. A service search unit 304 searches for a service executed by a device in the same network using a service search protocol such as UPnP (Universal Plug and Play). A service to be searched by the service search unit 304 is information representing what kind of relay function is being executed by a device in the same network. The protocol used by the service search unit 304 is not limited to UPnP, and any other service search protocol function is usable.

A disconnection detection unit 305 receives disconnection information from the cellular phone 103, thereby detecting disconnection of communication between the cellular phone 103 and the base station 104. A restoration detection unit 306 receives restoration information from the relay apparatus, thereby detecting that communication between the cellular phone 103 and the base station 104 is possible again (to be referred to as communication restoration hereinafter). When the relay apparatus relays by the IP router function, an IP router operation control unit 307 controls to cause the communication control unit 302 of the digital camera 101 to directly communicate data to the Web server 105. When the relay apparatus relays by the proxy function, a proxy operation control unit 308 controls to cause the communication control unit 302 of the digital camera 101 to communicate data to the relay apparatus that is executing the proxy function. A timer control unit 309 controls timer activation or timeout using the timing unit 215.

A determination unit 310 determines whether the relay apparatus found by the service search unit 304 is executing the IP router function and thus determines whether to operate the IP router operation control unit 307. The determination unit 310 also determines whether the relay apparatus found by the service search unit 304 is executing the proxy function and thus determines whether to operate the proxy operation control unit 308. The determination unit 310 also determines whether communication between the cellular phone 103 and the base station 104 has been disconnected or restored and which one of the IP router operation control unit 307 and the proxy operation control unit 308 is operating and thus determines whether to continue or interrupt the communication by the communication control unit 302. The determination unit 310 further determines based on the state of communication executed by the communication control unit 302 whether to control the power saving control unit 303 to set the power saving mode. In addition, the determination unit 310 determines whether the timer (timing unit 215) activated by the timer control unit 309 has reached the timeout and thus determines whether to stop an application or communication executed by the communication control unit 302.

Figure 4:
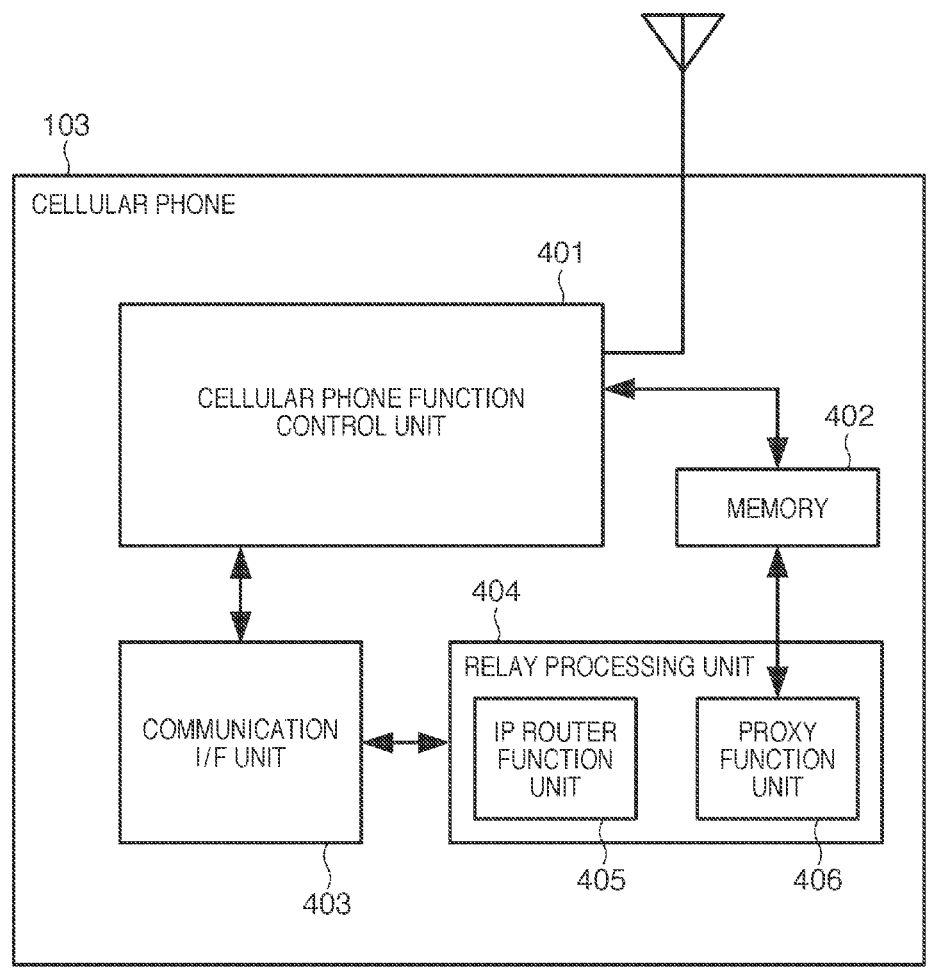
FIG. 4 is a block diagram showing the arrangement of a cellular phone.

FIG. 4 is a block diagram showing the arrangement of the cellular phone 103. Referring to FIG. 4, a cellular phone function control unit 401 includes a CPU, a ROM, a RAM, and the like (not shown) and implements, as a cellular phone, various known functions of, for example, connecting the cellular phone to a telephone network via a wireless base station. A memory 402 stores various kinds of data of the cellular phone 103. The memory 402 may include a detachable recording medium. A communication I/F unit 403 is an interface for wireless communication with an external device. In this embodiment, the communication I/F unit 403 wirelessly communicates with the communication I/F 206 of the digital camera 101 via the wireless LAN 100. Not the wireless LAN but Bluetooth or IrDA may be used for the wireless communication. A relay processing unit 404 includes an IP router function unit 405 and a proxy function unit 406 and performs data transmission relay processing by one of the IP router function and the proxy function described above. Note that in this embodiment, the user selects, on the cellular phone 103, one of the IP router function and the proxy function to be used. However, the present invention is not limited to this. The user may operate the digital camera 101 so that the digital camera 101 can instruct the cellular phone 103 of one of the IP router function and the proxy function to be used. Alternatively, the cellular phone 103 may be able to execute only one of the IP router function and the proxy function. In this embodiment, an arrangement using a cellular phone as a relay apparatus will be described. However, the relay apparatus may be a network router or a proxy server.

Note that the above-described functional block diagram is merely an example of the embodiment of the present invention, and the functional block arrangement is not necessarily critical. The present invention incorporates any functional block arrangement capable of practicing the present invention.

<<Operation of Relay by IP Router Function>>

Figure 5:
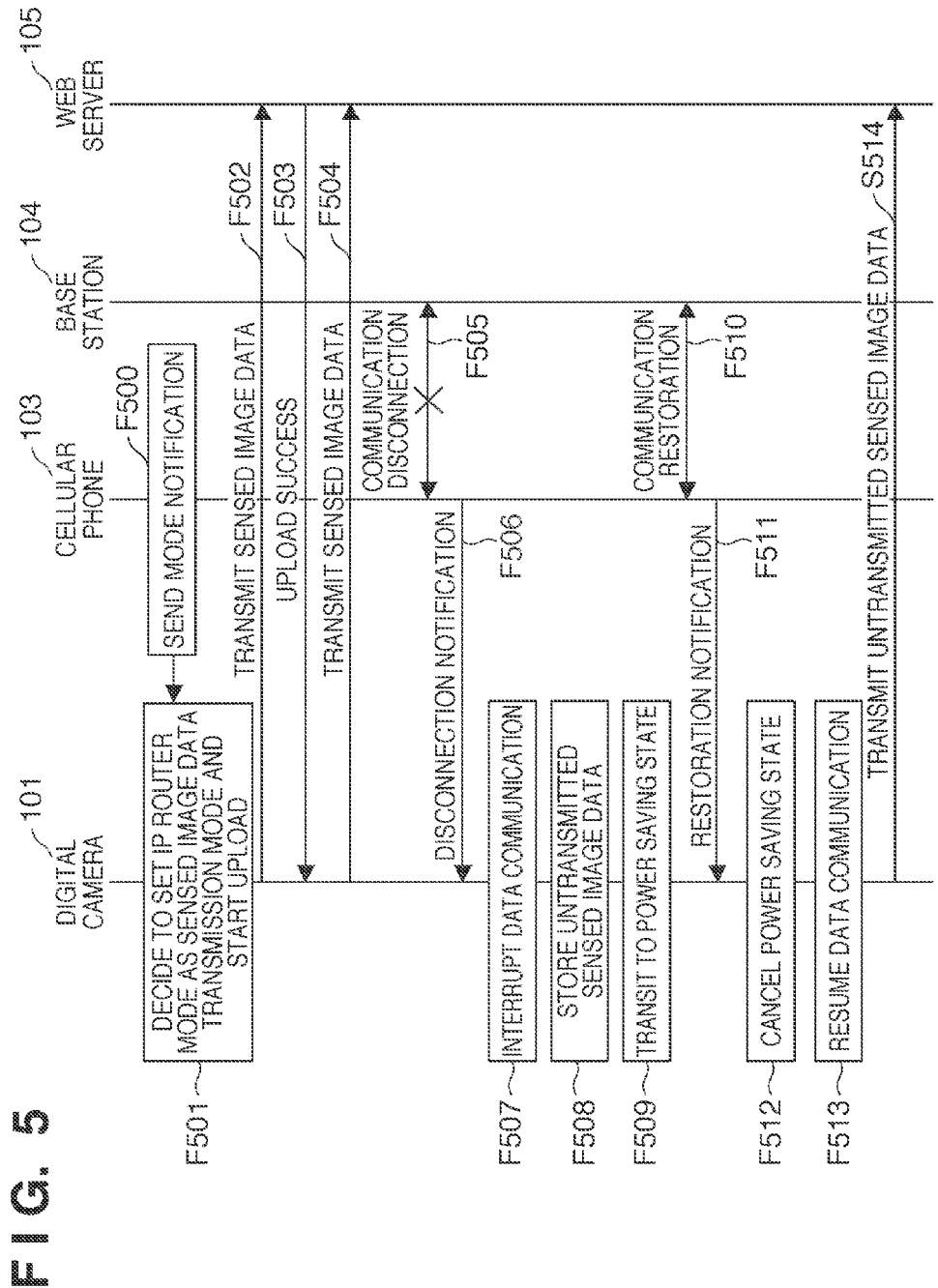
FIG. 5 is a sequence chart of data transmission in the IP router mode.

FIG. 5 is a sequence chart of sensed image data (the above-described compressed image data) uploaded by the digital camera 101 to the Web server 105 via the IP router function of the cellular phone 103 in the arrangement of FIG. 1. Here will be described data communication control in case of communication disconnection between the cellular phone 103 and the base station 104 when the cellular phone 103 is relaying data communication by the IP router function. Data communication control after the communication between the cellular phone 103 and the base station 104 has been restored will also be described.

First, the user operates the cellular phone 103 to decide to make the cellular phone 103 relay data by the IP router function. The user then operates the digital camera 101 to activate an upload application that transmits sensed image data to the Web server 105. In this embodiment, the digital camera 101 decides the transmission mode at the start of sensed image data upload. There are two transmission modes: an IP router mode in which the IP router operation control unit 307 transmits sensed image data and a proxy mode in which the proxy operation control unit 308 transmits sensed image data. When the cellular phone 103 is to relay by the IP router function, the determination unit 310 of the digital camera 101 decides to set the IP router mode as the transmission mode. When the cellular phone 103 is to relay by the proxy function, the determination unit 310 decides to set the proxy mode as the transmission mode. In this embodiment, the digital camera 101 causes the service search unit 304 to detect that the cellular phone 103 is operating by the IP router function (F500). Hence, the determination unit 310 decides to operate the IP router operation control unit 307. The digital camera 101 activates the IP router operation control unit 307 and starts upload (F501).

The digital camera 101 transmits sensed image data to the Web server 105 via the cellular phone 103. In the relay by the IP router function, the cellular phone 103 directly relays the sensed image data transmitted from the digital camera 101 to the Web server 105 (F502). Subsequently, the Web server 105 returns information representing an upload success to the digital camera 101 (F503). The digital camera 101 transmits next sensed image data to the Web server 105 via the cellular phone 103. At this time, the cellular phone 103 transparently relays the sensed image data transmitted from the digital camera 101 (F504), as in step F502. Assume that the communication between the cellular phone 103 and the base station 104 is disconnected during the time the cellular phone 103 is transparently relaying the sensed image data transmitted from the digital camera 101 (F505). For example, when the cellular phone 103 moves out of the communication area of the base station 104, the communication between them is disconnected. Upon detecting disconnection of the communication with the base station 104, the cellular phone 103 sends a disconnection notification to the digital camera 101 (F506). Note that the cellular phone 103 may notify the digital camera 101 that it is out of the communication area of the base station 104. The disconnection detection unit 305 of the digital camera 101 receives the disconnection notification from the cellular phone 103. When the disconnection detection unit 305 of the digital camera 101 receives the disconnection notification, the determination unit 310 determines whether the IP router operation control unit 307 is operating. If the disconnection notification is received from the cellular phone 103 during the operation of the IP router operation control unit 307, the determination unit 310 determines that the data communication between the digital camera 101 and the Web server 105 is impossible, and decides to immediately interrupt the data communication. In this case, since the IP router operation control unit 307 is operating, the digital camera 101 immediately interrupts the data communication (F507).

When the data communication is interrupted, the determination unit 310 of the digital camera 101 stores, in the memory unit 208, untransmitted sensed image data yet to be transmitted to the Web server 105 (F508). When the memory unit 208 stores the untransmitted sensed image data, the digital camera 101 controls the power saving control unit 303 so as to shift to the power saving mode (F509). This allows the digital camera 101 to save power during the communication disconnection between the cellular phone 103 and the base station 104.

After that, for example, when the cellular phone 103 enters the communication range of the base station 104, and the communication between them is restored (reconnected) (F510), the cellular phone 103 sends a restoration notification to the digital camera 101 (F511). Note that the cellular phone 103 may notify the digital camera 101 that it is in the communication area of the base station 104. When the restoration detection unit 306 of the digital camera 101 receives the restoration notification from the cellular phone 103, the determination unit 310 controls the power saving control unit 303 to cancel the power saving mode (F512). The determination unit 310 of the digital camera 101 also controls the IP router operation control unit 307 to resume the data communication with the Web server 105 (F513). When the data communication with the Web server 105 is resumed, the digital camera 101 transmits the untransmitted sensed image data stored in the memory unit 208 to the Web server 105. At this time, the cellular phone 103 transparently relays the sensed image data transmitted from the digital camera 101 (F514), as in step F502.

<<Operation of Relay by Proxy Function>>

Figure 6:
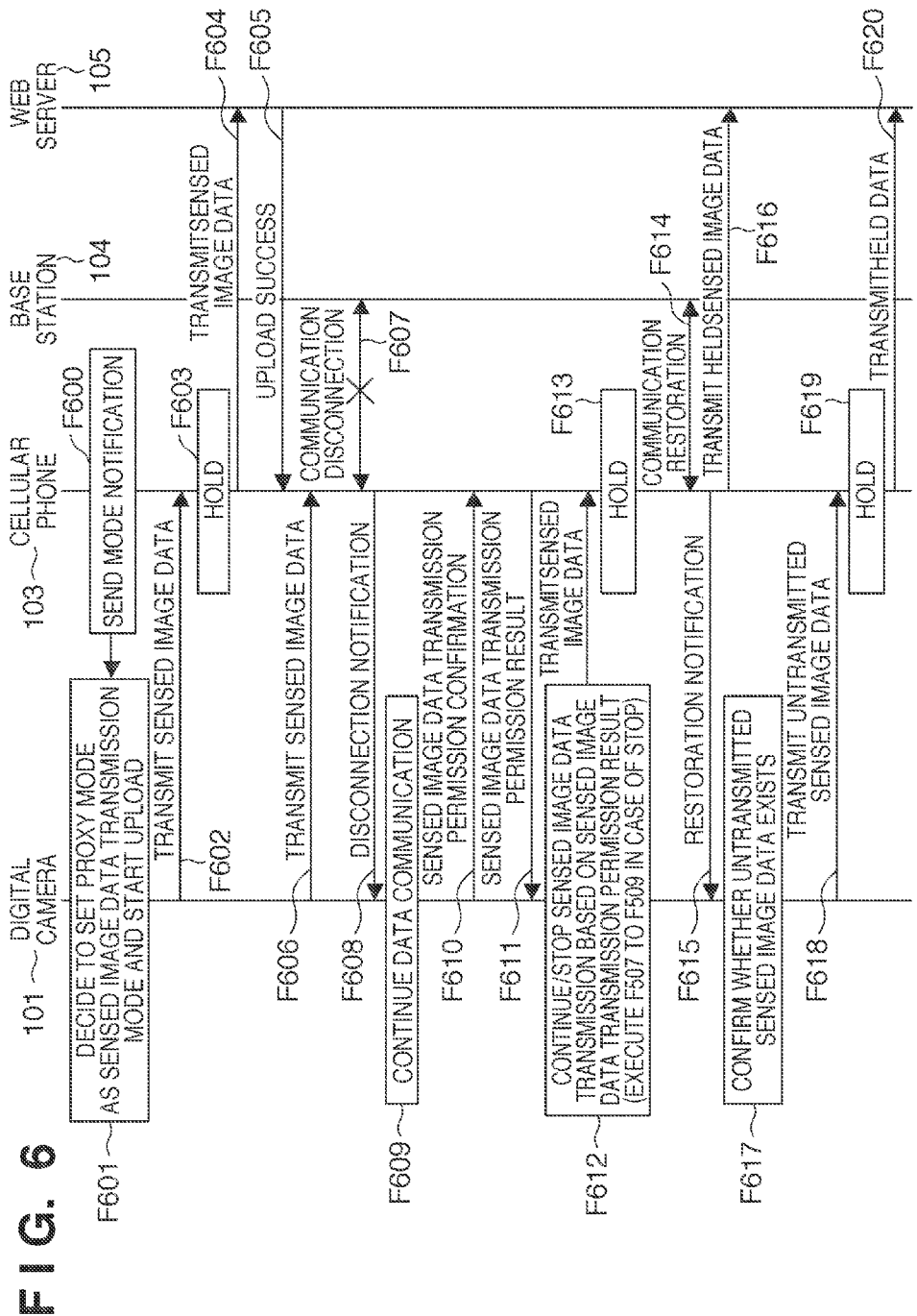
FIG. 6 is a sequence chart of data transmission in the proxy mode.

FIG. 6 illustrates a processing sequence when the digital camera 101 uploads sensed image data to the Web server 105 by the proxy function of the cellular phone 103 (when uploading in the proxy mode). The user operates the operation unit 210 of the digital camera 101 to start uploading sensed image data. In this case, the service search unit 304 detects that the cellular phone 103 is operating by the proxy function (F600). Hence, the determination unit 310 of the digital camera 101 decides to operate the proxy operation control unit 308. The digital camera 101 thus starts uploading sensed image data in the proxy mode (F601).

The digital camera 101 transmits the sensed image data to the cellular phone 103 that is executing the proxy function (F602). The cellular phone 103 temporarily holds the sensed image data transmitted from the digital camera 101 (F603). The cellular phone 103 then proxy-transmits the temporarily held sensed image data to the Web server 105 via the base station 104 (F604). The Web server 105 returns information representing an upload success to the cellular phone 103 (F605). The digital camera 101 transmits next sensed image data to the cellular phone 103 that is executing the proxy function (F606). Assume that the communication between the cellular phone 103 and the base station 104 is disconnected during the time the cellular phone 103 is proxy-transmitting the data (F607). Upon detecting the disconnection, the cellular phone 103 sends a disconnection notification to the digital camera 101 (F608).

When the disconnection detection unit 305 of the digital camera 101 receives the disconnection notification from the cellular phone 103, the determination unit 310 determines whether the proxy operation control unit 308 is operating. If the proxy operation control unit 308 is operating, the determination unit 310 decides to continue the data communication regardless of the communication disconnection between the cellular phone 103 and the base station 104 (F609). When the cellular phone 103 performs proxy transmission using the proxy function, it temporarily holds data transmitted from the digital camera 101 and proxy-transmits the data to the Web server 105. Hence, even if the digital camera 101 continues sensed image data transmission to the cellular phone 103 in the state in which the communication between the cellular phone 103 and the base station 104 is disconnected, the cellular phone 103 can hold the sensed image data. For this reason, the determination unit 310 of the digital camera 101 decides to continue the sensed image data transmission.

After that, to determine whether the cellular phone 103 has a free space to temporarily hold the sensed image data, the digital camera 101 controls the communication control unit 302 to transmit a sensed image data transmission permission confirmation to the cellular phone 103 (F610). The sensed image data transmission permission confirmation includes information of the size of the sensed image data to be transmitted. The communication control unit 302 of the digital camera 101 receives a sensed image data transmission permission result returned from the cellular phone 103 (F611). The sensed image data transmission permission result includes information representing whether the cellular phone has the free space to hold the sensed image data. Note that the sensed image data transmission permission result may include the size information of the storage area of the cellular phone 103 (temporarily holdable data size). In this case, the digital camera 101 determines based on the added size information whether the cellular phone has the free space to hold the sensed image data. If the sensed image data transmission permission result returned from the cellular phone 103 indicates that there is the free space to hold the sensed image data, the determination unit 310 of the digital camera 101 continues sensed image data transmission (F612). The cellular phone 103 holds the sensed image data transmitted from the digital camera 101 (F613). On the other hand, if the sensed image data transmission permission result indicates that the cellular phone 103 has no free space to hold the sensed image data, the determination unit 310 immediately interrupts the data communication, stores, in the memory unit 208, untransmitted sensed image data yet to be transmitted to the Web server 105, and shifts to the power saving mode. That is, steps F507 to F509 in FIG. 5 are executed (F612).

After that, when the communication between the cellular phone 103 and the base station 104 is restored (reconnected) (F614), the cellular phone 103 sends a restoration notification to the digital camera 101 (F615). At this time, the cellular phone 103 proxy-transmits the sensed image data transmitted from the digital camera 101 and temporarily held in the memory of its own to the Web server 105 via the base station 104 (F616). When the restoration detection unit 306 of the digital camera 101 receives the restoration notification from the cellular phone 103, the determination unit 310 checks whether there exists untransmitted sensed image data stored in the memory unit 208 in step F612 (F617).

For example, if untransmitted sensed image data exists in the memory unit 208 because of the small storage area to temporarily hold sensed image data in the cellular phone 103, the untransmitted sensed image data is transmitted to the cellular phone 103 (F618). The cellular phone 103 temporarily holds the sensed image data transmitted from the digital camera 101 (F619), and proxy-transmits the temporarily held sensed image data to the Web server 105 (F620).

Figure 7B:
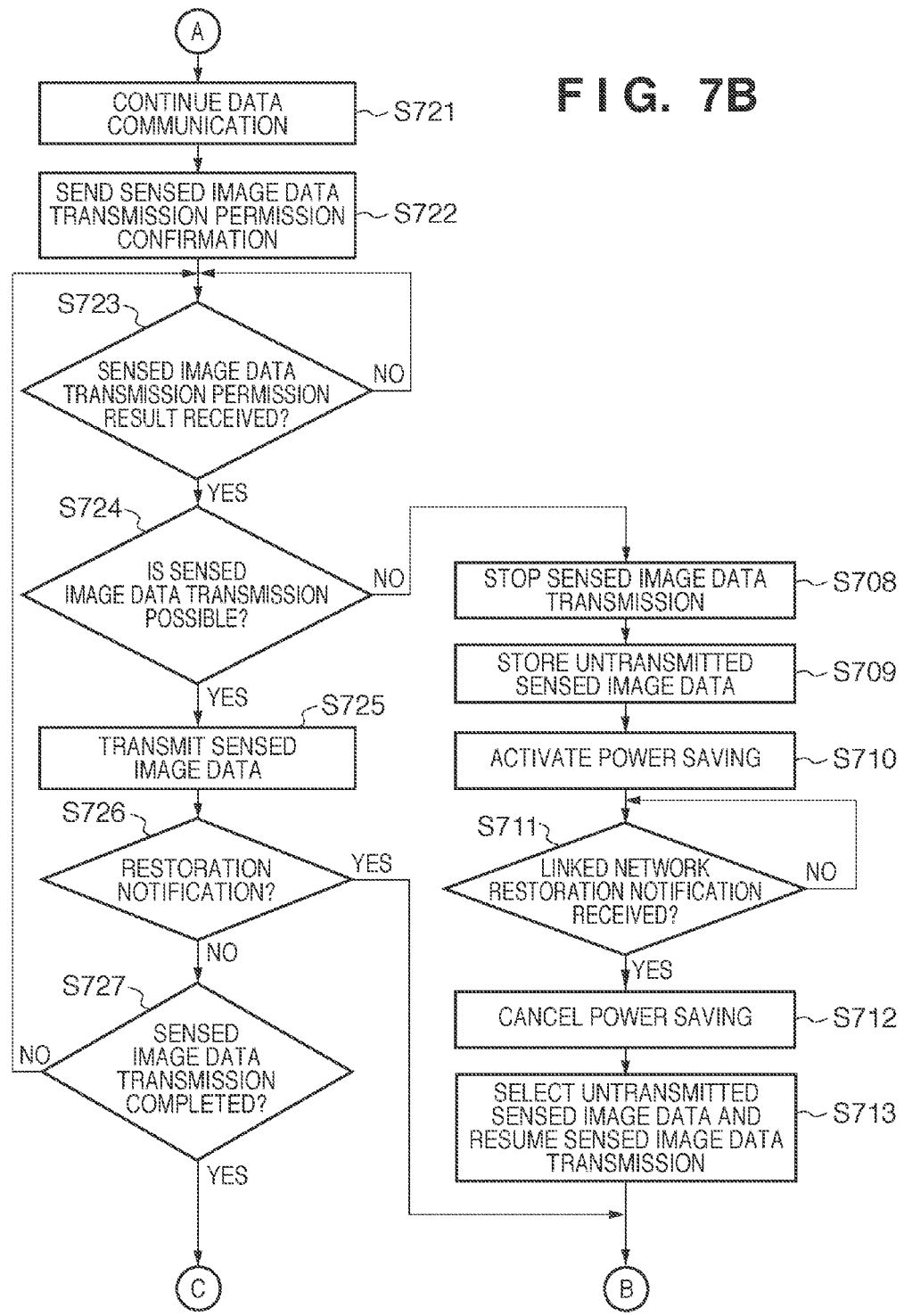

FIGS. 7A and 7B are flowcharts illustrating processing of the digital camera 101 performed to implement the sequences shown in FIGS. 5 and 6. These flowcharts are implemented by causing the control unit 201 of the digital camera 101 to read out and execute programs stored in the ROM 202.

When the user performs a predetermined operation via the operation unit 210 of the digital camera 101, the upload application is activated (S701). The determination unit 310 detects the relay function executed by the cellular phone 103, and decides the transmission mode (S702).

The determination unit 310 activates the IP router operation control unit 307 or the proxy operation control unit 308 based on the transmission mode decided in step S702, and transmits sensed image data to the Web server 105 via the cellular phone 103 (S703). The determination unit 310 periodically determines whether transmission of the sensed image data to be uploaded to the Web server 105 is completed (S704). If transmission of the sensed image data to be uploaded is completed, the process advances to step S705. Otherwise, the process advances to step S706. Note that the timer control unit 309 may activate the timer of the timing unit 215 at the same time as the start of sensed image data transmission in step S703. If the sensed image data transmission is not completed within a predetermined period, an error may be displayed on the display unit 209, and the sensed image data upload may be stopped. If transmission of the sensed image data to be uploaded is completed (YES in step S704), the digital camera 101 ends the sensed image data upload and also ends the upload application (S705). At this time, the digital camera logs out from the Web server 105 and disconnects the wireless layer communication with the cellular phone 103. Note that only communication of the layer above the wireless layer may be disconnected. In addition, the power saving control unit 303 shifts the communication control unit 302 to the power saving mode.

If transmission of the sensed image data to be uploaded is not completed (NO in step S704), the determination unit 310 determines whether the disconnection detection unit 305 has received the disconnection notification from the cellular phone 103 (S706). Upon determining that no disconnection notification is received from the cellular phone 103 (NO in step S706), the process returns to step S703 to continue sensed image data transmission to the Web server 105. On the other hand, upon determining that the disconnection notification has been received (YES in step S706), the determination unit 310 determines which one of the IP router mode and the proxy mode has been decided as the transmission mode in step S702 (S707). If the transmission mode of the digital camera 101 is the IP router mode, the process advances to step S708. If the transmission mode is the proxy mode, the process advances to step S721.

When the transmission mode is the IP router mode, the determination unit 310 determines that direct transparent data communication between the digital camera 101 and the Web server 105 is impossible, and interrupts the data communication (S708). If the data communication is interrupted in step S708, the determination unit 310 stores, in the memory unit 208, untransmitted sensed image data yet to be transmitted to the Web server 105 (S709). At this time, when an image is being transmitted, the digital camera 101 stores the entire image in the memory unit 208 to resend the image from the beginning, and then stores the succeeding image to be transmitted in the memory unit 208. When the untransmitted sensed image data is stored in the memory unit 208, the determination unit 310 controls the power saving control unit 303 to shift the communication control unit 302 to the power saving mode (S710).

Next, the determination unit 310 determines whether the restoration detection unit 306 has received the restoration notification from the cellular phone 103 (S711). If the restoration detection unit 306 has received the restoration notification (YES in step S711), the determination unit 310 causes the power saving control unit 303 to cancel the power saving mode of the communication control unit 302 (S712). When the power saving mode is canceled, the determination unit 310 decides to resume the data communication with the Web server 105. The IP router operation control unit 307 selects the untransmitted sensed image data stored in the memory unit 208 and transmits it to the Web server 105 (S713→S703). The determination unit 310 may cause the timer control unit 309 to activate the timer in step S710. Without restoration notification reception within a predetermined period, an error may be displayed on the display unit 209, and the sensed image data transmission application for sensed image data upload may be stopped.

As described above, upon detecting that the cellular phone 103 relays using the IP router function, the digital camera 101 decides to set the IP router mode as the transmission mode, and starts uploading sensed image data. When the communication between the cellular phone 103 and the base station 104 is disconnected, the digital camera 101 detects the disconnection notification sent from the cellular phone 103. Upon receiving the disconnection notification during sensed image data upload in the IP router mode, the digital camera 101 immediately temporarily stops sensed image data transmission, stores the untransmitted sensed image data in the memory unit 208, and sets the power saving mode. If the communication between the cellular phone 103 and the base station 104 is restored in this state, the digital camera 101 detects the restoration notification sent from the cellular phone 103, cancels the power saving mode, and automatically resumes transmission of the untransmitted sensed image data.

For example, assume that the cellular phone network is disconnected (the disconnection notification is received) halfway through the second of three sensed image data to be transmitted in the IP router mode. In this case, the data transmission immediately stops (S708), and the memory unit 208 stores the untransmitted images (in this case, the second image under transmission and the third image yet to be transmitted) (S709). When the transmission is resumed in accordance with reconnection of the network (reception of the restoration notification), the second image is resent from the beginning (S713→S703).

As a result, the digital camera 101 is prevented from unnecessarily transmitting sensed image data when the communication between the cellular phone 103 and the base station 104 is disconnected during transparent relay of data communication by the cellular phone 103 serving as an IP router. It is also possible to obtain the power saving effect of the digital camera 101 and the cellular phone 103. The digital camera 101 shifts to the communication power saving mode when temporarily stopping sensed image data transmission, and can therefore obtain a further power saving effect.

The user convenience also improves because the digital camera 101 automatically controls sensed image data transmission in accordance with disconnection/restoration of communication between the cellular phone 103 and the base station 104 and the data communication relay method of the relay apparatus without making the user concerned.

A case in which the transmission mode is determined to be the proxy mode in step S707 will be described. When the transmission mode is the proxy mode, the process advances to step S721, and the determination unit 310 decides to continue data communication.

To determine whether the cellular phone 103 has a free space to temporarily hold the sensed image data, the communication control unit 302 transmits the sensed image data transmission permission confirmation to the cellular phone 103 (S722). Note that the sensed image data transmission permission confirmation includes information of the size of the sensed image data to be transmitted. The determination unit 310 determines whether the communication control unit 302 has received the sensed image data transmission permission result returned from the cellular phone 103 (S723). Note that the timer control unit 309 may activate the timer at the same time as starting waiting for reception of the sensed image data transmission permission result. If the sensed image data transmission permission result is not received within a predetermined period, an error may be displayed on the display unit 209, and the sensed image data transmission application may be stopped.

Upon receiving the sensed image data transmission permission result returned from the cellular phone 103 (YES in step S723), the determination unit 310 determines, with reference to the sensed image data transmission permission result, whether the cellular phone 103 has the free space to temporarily hold the sensed image data (S724). That is, it is determined whether the digital camera 101 can transmit the sensed image data to the cellular phone 103. If the sensed image data transmission permission result indicates that there is the free space to hold the sensed image data (sensed image data transmission is possible) (YES in step S724), the determination unit 310 controls the communication control unit 302 to continue sensed image data transmission (S725).

After that, the determination unit 310 determines whether the restoration detection unit 306 has received the restoration notification from the cellular phone 103. Upon receiving the restoration notification (YES in step S726), the process returns to step S703. If the restoration notification is not received, the determination unit 310 determines whether transmission of the sensed image data to be uploaded is completed (S727). If transmission of the sensed image data to be uploaded is not completed (NO in step S727), the process returns to step S723 to repeat the above-described processing. On the other hand, when transmission of the sensed image data to be uploaded is completed (YES in step S727), the sensed image data transmission application for sensed image data upload ends (S705).

If the sensed image data transmission permission result indicates in step S724 that there is no free space to hold the sensed image data (sensed image data transmission is impossible), the process advances to step S708 to temporarily stop the data communication. In addition, the processes of steps S709 to S713 described above are performed.

As described above, upon detecting that the cellular phone 103 is operating by the proxy function, the digital camera 101 decides to set the proxy mode as the transmission mode, and starts uploading sensed image data. When the communication between the cellular phone 103 and the base station 104 is disconnected, the digital camera 101 detects the disconnection notification sent from the cellular phone 103. In the proxy mode, even if the disconnection is detected, the cellular phone 103 can hold the sensed image data, and the digital camera 101 therefore continues sensed image data transmission. However, the digital camera 101 sends the sensed image data transmission permission confirmation to the cellular phone 103 so as to perform the sensed image data transmission as far as the cellular phone 103 can temporarily hold data. As a result, if untransmitted sensed image data remains, the memory unit 208 stores it, and the power saving mode is set. When reconnected to the base station 104, the cellular phone 103 transmits the stored sensed image data to the Web server 105 and sends the network restoration notification to the digital camera 101. When the untransmitted sensed image data is stored in the memory unit 208, the digital camera 101 cancels the power saving mode and automatically resumes transmission upon detecting the restoration.

For example, assume that the digital camera 101, which is uploading sensed image data of 10 images in the proxy mode, detects communication disconnection between the cellular phone 103 and the base station 104 halfway through the second image. In this case, the digital camera 101 continues transmitting the remaining images until notified of sensed image data transmission prohibition by the sensed image data transmission permission result from the cellular phone 103 (S723, S724, and S725). If the cellular phone 103 has a storage capacity to hold 10 images, the digital camera 101 completes upload (S726→S727→S705).

On the other hand, assume that the digital camera is notified of sensed image data transmission prohibition by the sensed image data transmission permission result from the cellular phone 103 during transmission of the fifth image after the disconnection notification of the communication between the cellular phone 103 and the base station 104 has been received. In this case, the digital camera 101 immediately stops data transmission and stores the untransmitted images including the image under transmission (fifth to 10th images) in the memory unit 208 (S708 and S709). Upon receiving the restoration notification, the digital camera uploads the fifth to 10th images from the beginning of the fifth image and ends the processing (S713→S703→S705).

Note that the data size information of the sensed image data added to the sensed image data transmission permission confirmation notification in step S722 is, for example, the total size information of the second to 10th images in the above-described example (the size of the second image may be that of the untransmitted portion). The cellular phone 103 determines based on the added size information whether it has a storage capacity to hold the remaining images, sends a sensed image data transmission permission result representing the determination result to the digital camera 101. This allows to continue data transmission only when the cellular phone 103 can hold all the remaining images. Hence, the digital camera can be prevented from becoming incapable of transmission halfway through an image. If transmission becomes impossible halfway through an image, transmission of that image so far goes to waste. Hence, according to the above-described arrangement, it is possible to more reliably prevent unnecessary data transmission.

Additionally, when the size information of data holdable by the cellular phone 103 is added to the sensed image data transmission permission result to be transmitted from the cellular phone 103, the digital camera 101 can determine how many images can completely be transmitted. Hence, by continuing data transmission as far as the digital camera 101 can complete the transmission, the digital camera can be prevented from becoming incapable of transmission halfway through an image. It is therefore possible to more reliably prevent unnecessary data transmission.

According to the digital camera 101 having the above-described arrangement, when the communication between the cellular phone 103 and the base station 104 is disconnected during proxy transmission by the cellular phone 103 acting as a proxy, the sensed image data transmission is controlled in accordance with whether the cellular phone 103 can hold the sensed image data. Hence, the transmission time can be shortened by continuing data transmission. It is also possible to prevent sensed image data transmission more than the capacity of the storage area of the cellular phone 103.

That is, when the communication between the cellular phone 103 and the base station 104 is disconnected, the digital camera 101 continues sensed image data transmission as far as the cellular phone 103 can hold the data. For this reason, if the cellular phone 103 has a storage area to store all sensed image data to be uploaded by the digital camera 101, the digital camera 101 can complete the sensed image data upload processing even in case of disconnection between the cellular phone 103 and the base station 104. As a result, power saving and speedup of upload processing can be expected. Even if the cellular phone 103 cannot hold all sensed image data to be uploaded by the digital camera 101 at the time of disconnection between the cellular phone 103 and the base station 104, the digital camera 101 continues sensed image data transmission to the cellular phone 103 as far as possible. Hence, the sensed image data upload time can be expected to shorten. Since the digital camera 101 shifts to the power saving mode when temporarily stopping sensed image data transmission, as in the IP router mode, a power saving effect can be expected.

Furthermore, the user convenience can also be expected or improve because the digital camera 101 automatically controls sensed image data transmission in accordance with disconnection/restoration of communication between the cellular phone 103 and the base station 104 and the data communication relay method of the relay apparatus without making the user concerned.

Note that in the above embodiment, disconnection or restoration of communication between the cellular phone 103 and the base station 104 has been described. However, the present invention is not limited to this and is similarly applicable to disconnection or restoration of communication between the cellular phone 103 and the Web server 105 or between the base station 104 and the Web server 105.

Second Embodiment

The hardware configuration and functional blocks of a communication apparatus practicing the second embodiment of the present invention are the same as in the first embodiment. The same reference numerals denote the same parts, and a description thereof will not be repeated here. In the first embodiment, after receiving the restoration notification from the cellular phone 103, the digital camera 101 immediately resumes sensed image data transmission to transmit untransmitted sensed image data. However, when the cellular phone 103 is moving, its state is supposed to frequently switch between the communicable zone and the incommunicable zone. If the cellular phone 103 and the base station 104 are repeatedly connected and disconnected, a single image is resent many times so the data communication may go to waste. The second embodiment solves this. FIG. 8 is a flowchart for explaining control of sensed image data transmission resumption according to the second embodiment.

Note that a digital camera 101 performs the same operation as in the flowcharts of FIGS. 7A and 7B of the first embodiment from activation of an upload application (S701) to storage of untransmitted sensed image data (S709), and a description thereof will not be repeated here. When the untransmitted sensed image data is stored in a memory unit 208 in step S709, a determination unit 310 causes a power saving control unit 303 to shift a communication control unit 302 to the power saving mode (S801). Next, the digital camera 101 waits for a restoration notification from a cellular phone 103 (S802). When a restoration detection unit 306 receives the restoration notification, the determination unit 310 controls a timer control unit 309 to activate a detection timer that measures the disconnection/restoration detection interval (S803). This detection timer aims at estimating whether disconnection (outside the communication area) and restoration (within the communication area) frequently switch in a short time (for example, several sec), that is, the cellular phone 103 is moving. Note that the frequent switching between disconnection (outside the communication area) and restoration (within the communication area) (or cellular phone's moving) need not always be detected by measurement using such a timer. For example, the detection may be done by measuring the frequency of switching between disconnection and restoration per unit time. Alternatively, current position information may be added to disconnection notifications and restoration notifications in a unit time. It may be determined that the cellular phone is moving when the change in the position information is large.

Next, the determination unit 310 checks whether a disconnection detection unit 305 has received a disconnection notification representing that the cellular phone 103 and a base station 104 are incommunicable (S804). If the disconnection notification is received before the detection timer expires (YES in step S804), the determination unit 310 determines that disconnections are frequent (the cellular phone is moving). Hence, the determination unit 310 stops the detection timer (S806), and the process returns to step S802 while keeping the power saving mode. If the disconnection notification is not received, the determination unit 310 checks whether the detection timer has expired (S805). If the detection timer has not expired, the process returns to step S804. If the detection timer has expired without receiving the disconnection notification, that is, if the cellular phone 103 and the base station 104 are not disconnected for a predetermined time or more (YES in step S805), the determination unit 310 determines which one of the IP router mode and the proxy mode has been set as the transmission mode (S807). Upon determining that the transmission mode is the IP router mode, the process advances to step S808. Upon determining that the transmission mode is the proxy mode, the process advances to step S815.

In step S808, the determination unit 310 causes the power saving control unit 303 to cancel the power saving mode. The determination unit 310 then connects a Web server 105 via the cellular phone 103 and the base station 104 in the IP router mode and performs authentication (S809). After that, the process advances to step S713 to start resending the sensed image data, as described in the first embodiment. Note that when completing sensed image data transmission and ending the sensed image data transmission application, the determination unit 310 logs out from the Web server 105 and disconnects the cellular phone 103 (S705).

On the other hand, upon determining that the transmission mode is the proxy mode, the determination unit 310 sends a sensed image data transmission permission confirmation notification to determine whether the cellular phone 103 has a free space to hold the sensed image data (S815). The determination unit 310 determines whether a sensed image data transmission permission result has been received from the cellular phone 103 (S816). Upon receiving the sensed image data transmission permission result (YES in step S816), the determination unit 310 checks whether sensed image data transmission is possible (S817). If sensed image data transmission is not possible (NO in step S817), the process returns to step S815 to repeat the above-described processing until communication is possible. Note that in this embodiment, the digital camera 101 immediately transmits the sensed image data transmission permission confirmation notification to the cellular phone 103. However, if NO in step S817, the confirmation notification may be sent after keeping the power saving mode for a predetermined time.

If sensed image data transmission is possible (YES in step S817), the power saving mode is canceled (S818), and the process advances to step S713 to resend the sensed image data. Note that in the first embodiment, the power saving mode is immediately canceled upon detecting the restoration notification. In the second embodiment, however, after confirming that the cellular phone 103 has changed to the state capable of holding data, the power saving mode is canceled to start resending the data. This can make data communication of resending more reliable. Note that such a processing procedure is applicable to the first embodiment as well, as a matter of course.

As described above, according to the second embodiment, the frequency of occurrences of disconnection notifications and restoration notifications from the cellular phone 103 serving as the relay apparatus is measured (estimated), thereby resuming data transmission at an appropriate timing. That is, if the measured frequency exceeds a predetermined value, sensed image data resending is not performed even upon receiving the restoration notification. This makes it possible to prevent immediate interrupt of data transmission after its resumption and avoid unnecessary consumption of wireless resources and batteries.

As described above, according to the embodiments, when a data transmission apparatus communicates with a public network server via a relay apparatus, the data transmission apparatus detects the communication network disconnection of the relay apparatus and controls the data transmission in accordance with the data communication relay method of the relay apparatus. This can prevent unnecessary data transmission and overflow of the storage area of the relay apparatus.

Note that although a wireless LAN system is used for communication between the digital camera and the cellular phone in the above embodiments, the present invention is not limited to this. Additionally, although the digital camera has been exemplified as the communication apparatus, and the cellular phone has been exemplified as the relay apparatus, the present invention is not limited to this. For example, the present invention is applicable even when the communication apparatus is a video camera, and the relay apparatus is a mobile router.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, non-transitory computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-139949, filed Jun. 18, 2010, which is hereby incorporated by reference herein in its entirety.

What is claimed is:

1. A communication apparatus comprising:
 a transmission unit configured to transmit data to another communication apparatus via a relay apparatus;
 a detection unit configured to detect which of a first relay function or a second relay function is being used by the relay apparatus to operate, wherein the first relay function is for causing the relay apparatus to receive the data transmitted from the communication apparatus to the relay apparatus as a communication partner and proxy-transmit the data to the other communication apparatus as a communication partner, and wherein the second relay function is for causing the relay apparatus to relay the data transmitted from the communication apparatus to the other communication apparatus as a communication partner; and
 a control unit configured to, in a case where the transmission of the data was interrupted due to disconnection of communication between the relay apparatus and the other communication apparatus and then said communication is restored, resume the transmission of the data after authentication between said communication apparatus and the other communication apparatus when the relay apparatus is operating by the second relay function and resume the transmission of the data in a state where the authentication is omitted when the relay apparatus is operating by the first relay function.

2. The apparatus according to claim 1, wherein said transmission unit transmits the data in a transmission mode corresponding to a detection result of said detection unit.

3. The apparatus according to claim 1, further comprising a reception unit configured to receive, from the relay apparatus, a disconnection notification representing the disconnection of the communication between the relay apparatus and the other communication apparatus.

4. The apparatus according to claim 1, further comprising a determination unit configured to determine, in case of the disconnection of the communication between the relay apparatus and the other communication apparatus, whether the relay apparatus has a free space to hold the data,
 wherein if said determination unit determines that the free space does not exist, said control unit interrupts the data transmission by said transmission unit when the relay apparatus is operating by the first relay function.

5. The apparatus according to claim 1, further comprising a power saving unit configured to set a wireless unit of the communication apparatus in a power saving mode in case of the interruption of the data transmission by said transmission unit.

6. The apparatus according to claim 1, further comprising a measuring unit configured to measure a frequency of the disconnection of the communication between the relay apparatus and the other communication apparatus,
 wherein if the frequency measured by said measuring unit exceeds a predetermined value, said control unit does not resume the data transmission by said transmission unit even when the communication between the relay apparatus and the other communication apparatus is restored.

7. A communication method by a communication apparatus, comprising:
 transmitting data to another communication apparatus via a relay apparatus;
 detecting which of a first relay function or a second relay function is being used by the relay apparatus to operate, wherein the first relay function is for causing the relay apparatus to receive the data transmitted from the communication apparatus to the relay apparatus as a communication partner and proxy-transmit the data to the other communication apparatus as a communication partner, and wherein the second relay function is for causing the relay apparatus to relay the data transmitted from the communication apparatus to the other communication apparatus as a communication partner; and
 controlling to, in a case where the transmission of the data was interrupted due to disconnection of communication between the relay apparatus and the other communication apparatus and then said communication is restored, resume the transmission of the data after authentication between said communication apparatus and the other communication apparatus when the relay apparatus is operating by the second relay function, and resume the transmission of the data in a state where the authentication is omitted when the relay apparatus is operating by the first relay function.

8. A non-transitory computer readable storage medium storing a program that causes a computer to execute a communication method comprising:
 transmitting data to another communication apparatus via a relay apparatus;
 detecting which of a first relay function or a second relay function is being used by the relay apparatus to operate, wherein the first relay function is for causing the relay apparatus to receive the data transmitted from the communication apparatus to the relay apparatus as a communication partner and proxy-transmit the data to the other communication apparatus as a communication partner, and wherein the second relay function is for causing the relay apparatus to relay the data transmitted from the communication apparatus to the other communication apparatus as a communication partner; and
 controlling to, in a case where the transmission of the data was interrupted due to disconnection of communication between the relay apparatus and the other communication apparatus and then said communication is restored, resume the transmission of the data after authentication between said communication apparatus and the other communication apparatus when the relay apparatus is operating by the second relay function, and resume the transmission of the data in a state where the authentication is omitted when the relay apparatus is operating by the first relay function.

9. The apparatus according to claim 1, wherein said control unit resumes the transmission of the data after obtaining a permission from the relay apparatus in a case where the relay apparatus is operating by the first relay function.

10. The apparatus according to claim 1, wherein, in case of disconnection of communication between the relay apparatus and the other communication apparatus, said control unit continues the data transmission by said transmission unit as far as the relay apparatus is able to store the transmitted data when the relay apparatus is operating by the first relay function, and interrupt the data transmission by said transmission unit when the relay apparatus is operating by the second relay function.

* * * * *